(12) United States Patent
Lee

(10) Patent No.: US 7,960,960 B2
(45) Date of Patent: Jun. 14, 2011

(54) IRREGULAR VOLTAGE DETECTION AND CUTOFF CIRCUIT USING BANDGAP REFERENCE VOLTAGE GENERATION CIRCUIT

(75) Inventor: Chang-hoon Lee, Anyang-si (KR)

(73) Assignee: Samsung Electronics Co., Ltd., Suwon Si (KR)

( * ) Notice: Subject to any disclaimer, the term of this patent is extended or adjusted under 35 U.S.C. 154(b) by 534 days.

(21) Appl. No.: 12/104,140

(22) Filed: Apr. 16, 2008

(65) Prior Publication Data
US 2008/0278133 A1     Nov. 13, 2008

(30) Foreign Application Priority Data
May 10, 2007    (KR) .................. 10-2007-0045417

(51) Int. Cl.
*G05F 3/16* (2006.01)
(52) U.S. Cl. ...................................................... 323/313
(58) Field of Classification Search .................. 323/311, 323/312, 313, 314; 361/90, 92; 327/539, 327/545
See application file for complete search history.

(56) References Cited

U.S. PATENT DOCUMENTS

| | | | | |
|---|---|---|---|---|
| 5,497,112 A * | 3/1996 | Hoang | ........................... | 327/143 |
| 6,936,997 B2 * | 8/2005 | Mullett | ......................... | 323/222 |
| 7,200,066 B2 * | 4/2007 | Krenzke et al. | ............... | 365/226 |
| 7,250,811 B2 * | 7/2007 | Kim | ............................... | 327/538 |
| 7,369,382 B2 * | 5/2008 | Scheikl et al. | ................... | 361/90 |
| 2002/0158673 A1 * | 10/2002 | McClure et al. | ................. | 327/78 |
| 2008/0303504 A1 * | 12/2008 | Kang et al. | ..................... | 323/313 |
| 2009/0206810 A1 * | 8/2009 | Chellamuthu et al. | ........ | 323/282 |

FOREIGN PATENT DOCUMENTS

| | | |
|---|---|---|
| JP | 60-020159 | 2/1985 |
| JP | 05-173716 | 7/1993 |
| KR | 100000044338 A | 7/2000 |
| KR | 1020060087122 A | 8/2006 |

* cited by examiner

*Primary Examiner* — Adolf Berhane
(74) *Attorney, Agent, or Firm* — F. Chau & Associates, LLC

(57) ABSTRACT

An irregular voltage detection and cutoff circuit using a bandgap reference voltage generation circuit includes the bandgap reference voltage generation circuit, which generates a bandgap reference voltage from the power-supply voltage, a reference voltage generator, which generates a first reference voltage and a second reference voltage in the same voltage level as the bandgap reference voltage from the power-supply voltage, a voltage detector, which generates a detection voltage from the power-supply voltage, and a comparator, which generates a switching control signal that cuts off the power-supply voltage by comparing the first and second reference voltages with the detection voltage.

9 Claims, 4 Drawing Sheets

IRREGULAR VOLTAGE DETECTION AND CUTOFF CIRCUIT USING BANDGAP REFERENCE VOLTAGE GENERATION CIRCUIT

CROSS-REFERENCE TO RELATED PATENT APPLICATION

This application claims the benefit of Korean Patent Application No. 10-2007-0045417, filed on May 10, 2007, in the Korean Intellectual Property Office, the disclosure of which is incorporated herein in its entirety by reference.

BACKGROUND OF THE INVENTION

1. Technical Field

The present disclosure relates to a semiconductor integrated circuit and, more particularly, to a circuit that detects and cuts off an irregular voltage by using a bandgap reference voltage generation circuit.

2. Discussion of Related Art

When an irregular voltage, such as a too high voltage or a too low voltage, is applied to a system in which the range of operating power supply is set, the system cannot operate normally. Specifically, a high voltage can damage the system, and thus a circuit that cuts off a high voltage is required in order to protect the system.

FIG. 1 is a diagram illustrating a conventional protection circuit that can protect a display device from an unstable power supply. Referring to FIG. 1, when an input power-supply voltage Vin is outside a normal operation range, the protection circuit generates a main power-supply on/off signal MS, which forcibly turns off a main switch connecting the input power supply Vin and a power-supply generator (not shown). A reference voltage circuit 130 generates a minimum reference voltage and a maximum reference voltage based on the input power supply voltage Vin by using a sixth resistor R6 and a seventh resistor R7. The maximum reference voltage is inputted to a non-inverting input terminal (+) of a first comparator 122 and the minimum reference voltage is inputted to an inverting input terminal (−) of a second comparator 124.

The first comparator 122 generates a main power-supply control signal PCS by comparing a second voltage of a second node n2, which is stabilized by using a second zener diode ZD2 in a stabilization circuit 120, and the maximum reference voltage. In this example, when the second voltage is lower than the maximum reference voltage, the generated main power-supply control signal PCS is in a high state. The second comparator 124 generates the main power-supply control signal PCS by comparing a first voltage of a first node n1, which is stabilized by using a first zener diode ZD1 in a stabilization circuit 126, and the minimum reference voltage. In this example, when the first voltage is higher than the minimum reference voltage, the generated main power supply control signal PCS is in a high state. The main power-supply control signal PCS is transmitted to an output node nO, and then is stabilized by using a third zener diode ZD3 inside a stabilization circuit 132. Accordingly, the main power-supply control signal PCS is generated as the main power on/off signal MS. Consequently, the main power-supply on/off signal MS is generated in a high level which turns on the main switch in the range between the minimum reference voltage and the maximum reference voltage.

Turn-on voltages of the first, second and the third zener diodes ZD1, ZD2, and ZD3 used in the protection circuit, however, may change according to a process or temperature variations. This enlarges the range between a minimum reference voltage VLon and a maximum reference voltage VHoff controlled by the main power-supply on/off signal MS, such as VLon1 to VHoff1 or VLon2 to VHoff2, as illustrated in FIG. 2.

Accordingly, an irregular voltage detection and cutoff circuit, which can accurately control a voltage range between a minimum reference voltage and a maximum reference voltage, is required.

SUMMARY OF THE INVENTION

Exemplary embodiments of the present invention provide an irregular voltage detection and cutoff circuit using a bandgap reference voltage generation circuit.

According to an exemplary embodiment of the present invention, there is provided an irregular voltage detection and cutoff circuit, which monitors an operating voltage range of a power-supply voltage, the irregular voltage detection and cutoff circuit including: a bandgap reference voltage generation circuit, which generates a bandgap reference voltage from the power-supply voltage; a reference voltage generator, which generates a first reference voltage and a second reference voltage in the same voltage level as the bandgap reference voltage from the power-supply voltage; a voltage detector, which generates a detection voltage from the power-supply voltage; and a comparator, which generates a switching control signal that cuts off the power-supply voltage by comparing the first and second reference voltages with the detection voltage.

The reference voltage generation circuit may include: an OP amp, wherein the bandgap reference voltage is inputted to its non-inverting input terminal and the first reference voltage is inputted to its inverting input terminal; a PMOS transistor, whose gate is connected to an output of the OP amp, whose source is connected to the power-supply voltage, and whose drain is connected to the first reference voltage; a first resistor, which is connected between the first reference voltage and the second reference voltage; and a second resistor, which is connected between the second reference voltage and a ground voltage.

The voltage detector may include: a third resistor, which is connected between the power-supply voltage and the detection voltage; and a fourth resistor, which is connected between the detection voltage and the ground voltage. The third and fourth resistors may have a resistance ratio of $$\frac{R3}{R4} = \frac{V\max}{Vbg} - 1$$

with reference to the bandgap reference voltage and a maximum voltage of the operating voltage range, where R3 denotes the third resistor, R4 denotes the fourth resistor Vbg denotes the bandgap reference voltage, and Vmax denotes the maximum voltage.

The first through fourth resistors may have a resistance ratio of $$\frac{R2}{R1+R2} * Vbg = \frac{R3}{R3+R4} * V\min$$

with reference to the bandgap reference voltage and a minimum voltage of the operating voltage range, where R1 denotes the first resistor, R2 denotes the second resistor, R3 denotes the third resistor, R4 denotes the fourth resistor, Vbg denotes the bandgap reference voltage, and Vmin denotes the minimum voltage.

The comparator may include: a first comparator, which compares the first reference voltage and the detection voltage; a second comparator, which compares the second reference voltage and the detection voltage; and a logic circuit, which generates the switching control signal by AND operating an output of the first comparator and an output of the second comparator.

The bandgap reference voltage generation circuit may include: an OP amp, which provides an output of the OP amp as a bias voltage and compares a first voltage and a second voltage; a first NMOS transistor which is connected between the output of the OP amp and a ground voltage and whose gate is connected to a reset signal; a first PMOS transistor, which is connected between the power-supply voltage and the first voltage and whose gate is connected to the output of the OP amp; a second PMOS transistor, which is connected between the power-supply voltage and the second voltage and whose gate is connected to the output of the OP amp; a third PMOS transistors which is connected between the power-supply voltage and the bandgap reference voltage and whose gate is connected to the output of the OP amp; a first resistor, which is connected between the first voltage and the ground voltage; a first diode, which is connected between the first voltage and the ground voltage; a second resistor, which is connected between the second voltage and the ground voltage; a third resistor and a second diode group, which are connected in series between the second voltage and the ground voltage; and a fourth resistor, which is connected between the bandgap reference voltage and the ground voltage.

The OP amp may include: a fourth PMOS transistor, whose source is connected to the power-supply voltage and whose gate is connected to the output of the OP amp; fifth and sixth PMOS transistors, whose sources are connected to a drain of the fourth PMOS transistor and whose gates are respectively connected to the first voltage and second voltage; second and third NMOS transistors, which are respectively connected between drains of the fifth and sixth PMOS transistors and the ground voltage and whose drains and gates are connected to each other; a fourth NMOS transistor, whose gate is connected to the gate of the second NMOS transistor and whose source is connected to the ground voltage so as to form a current mirror with the second NMOS transistor; a fifth NMOS transistor, whose drain is connected to the output of the OP amp, whose gate is connected to the gate of the third NMOS transistor, and whose source is connected to the ground voltage so as to form a current mirror with the third NMOS transistor; a seventh PMOS transistor, whose source is connected to the power-supply voltage, and whose drain and gate are connected to a drain of the fourth NMOS transistor; and an eighth PMOS transistor, whose source is connected to the power-supply voltage, whose drain is connected to the output of the OP amp, and whose gate is connected to a gate of the seventh PMOS transistor so as to form a current mirror with the seventh PMOS transistor. The second diode group may be formed of a plurality of diodes connected in parallel between the third resistor and the ground voltage.

The switching control signal may turn on or off a switch connecting the power-supply voltage and a main system.

Accordingly, the irregular voltage detection and cutoff circuit of exemplary embodiments of the present invention can accurately control the operating voltage range of the power-supply voltage by using the BGR circuit that is stable in the face of changes of the power-supply voltage and temperature.

BRIEF DESCRIPTION OF THE DRAWINGS

Exemplary embodiments of the present invention will be understood in more detail from the following descriptions taken in conjunction with the attached drawings, in which.

DETAILED DESCRIPTION OF EXEMPLARY EMBODIMENTS

Figure 1:
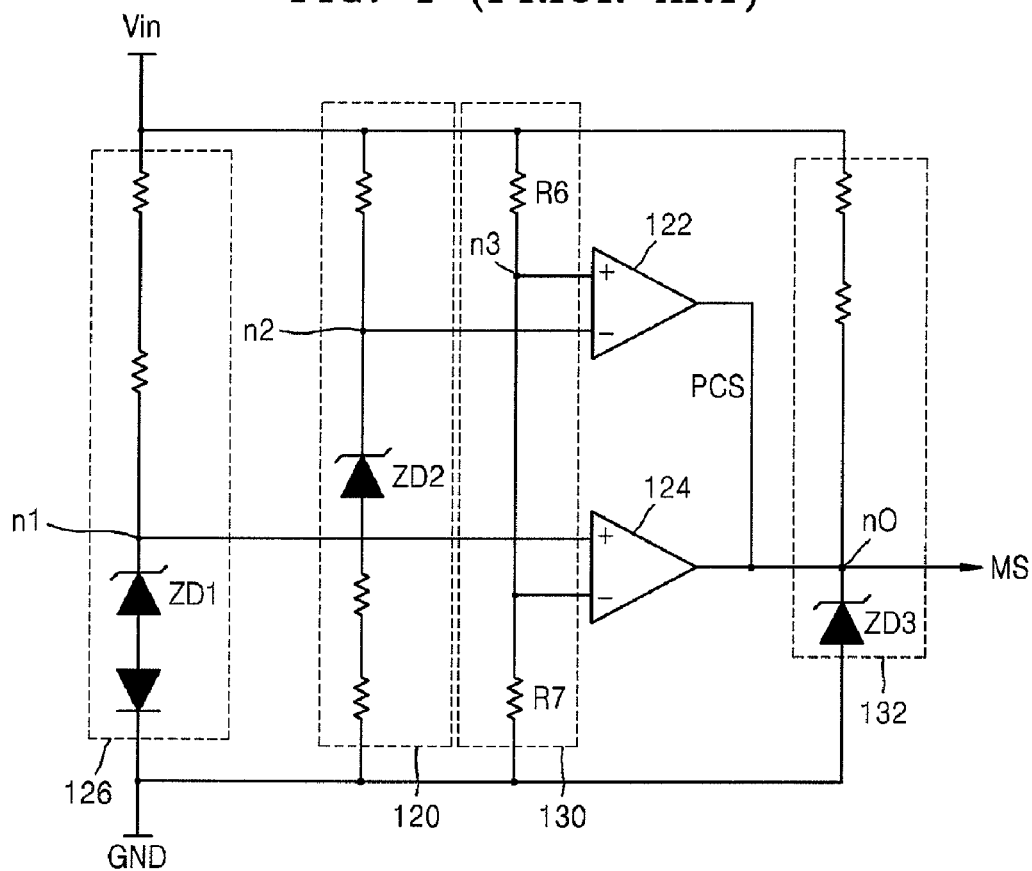
FIG. 1 is a diagram illustrating a conventional protection circuit that can protect a display device from an unstable power supply.
Figure 2:
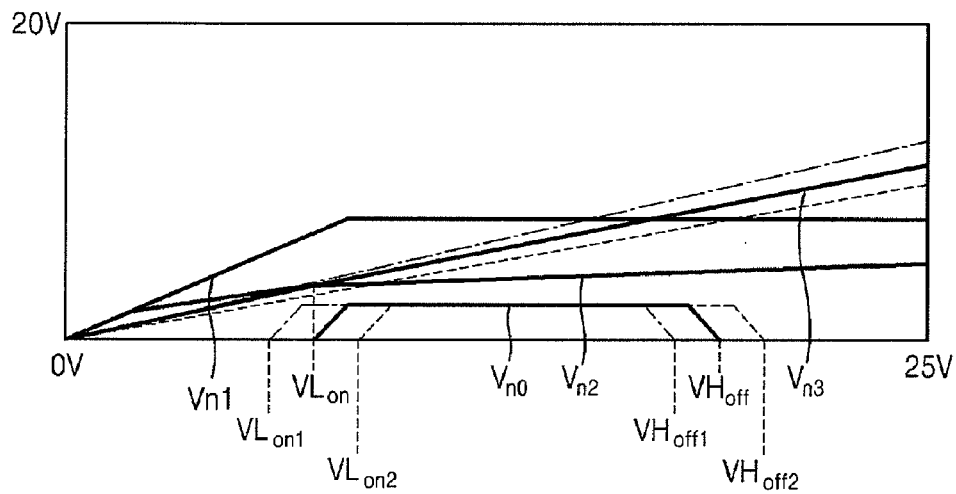
FIG. 2 is a graph for describing an operation of the protection circuit illustrated in FIG. 1.

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments with reference to the attached drawings. Like reference numerals in the drawings denote like elements.

Figure 3:
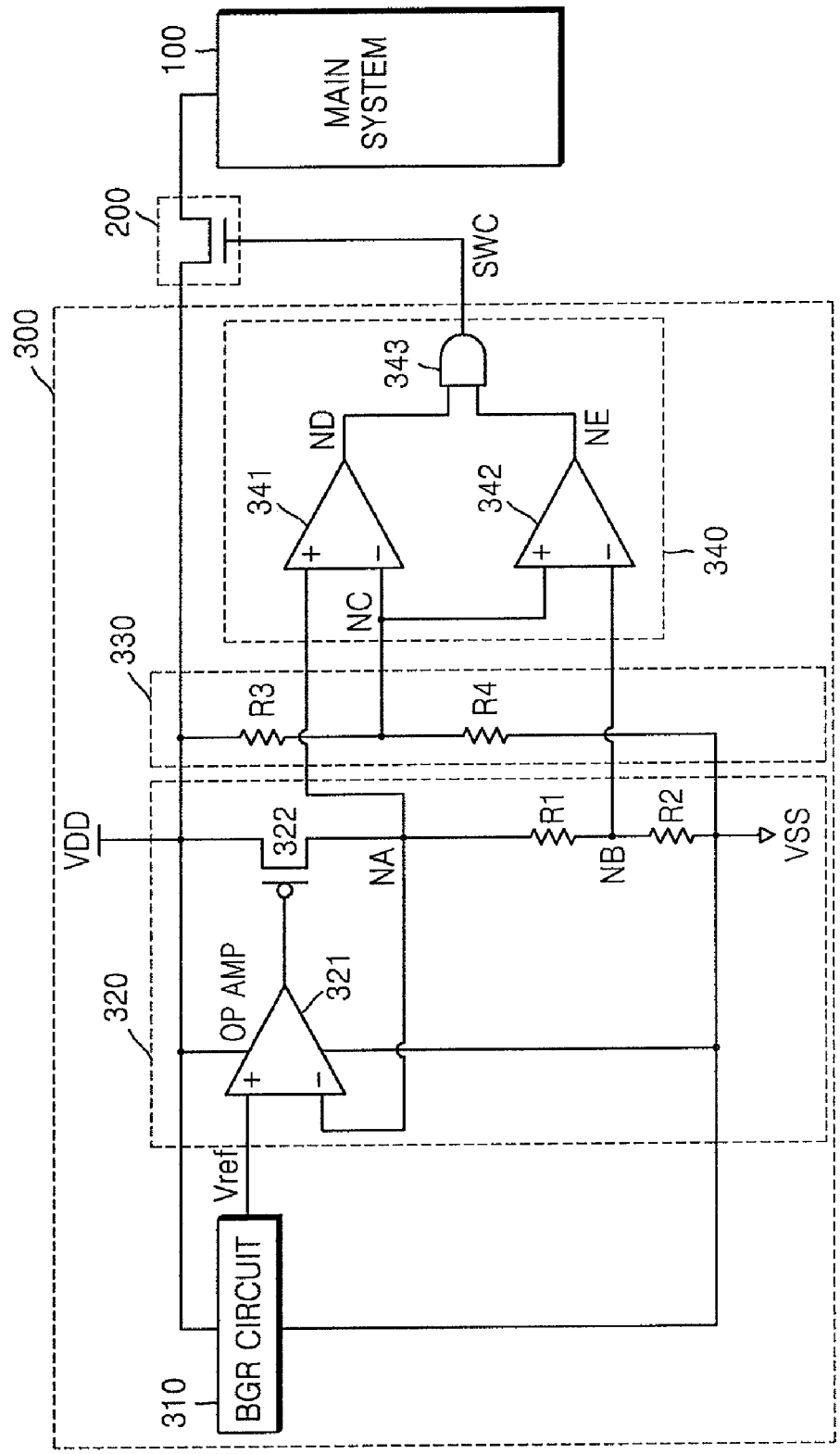
FIG. 3 is a diagram illustrating an irregular voltage detection and cutoff circuit according to an exemplary embodiment of the present invention.

FIG. 3 is a diagram illustrating an irregular voltage detection and cutoff circuit 300 according to an exemplary embodiment of the present invention. Referring to FIG. 3, the irregular voltage detection and cutoff circuit 300 monitors whether a power-supply voltage VDD is within an operating voltage range, and when the power-supply voltage VDD is outside the operating voltage range, turns off a switch 200 in order to cut off a connection between the power-supply voltage VDD and a main system 100. In an exemplary embodiment, the operating voltage range is from 4.30 V to 5.35 V. The main system 100 may be a stand alone integrated circuit (IC) chip or an important circuit block inside an IC including the irregular voltage detection and cutoff circuit 300.

The irregular voltage detection and cutoff circuit 300 includes a bandgap reference voltage generation circuit 310 (hereinafter, referred to as a BGR circuit 310), a reference voltage generator 320, a voltage detector 330, and a comparator 340.

Figure 4:
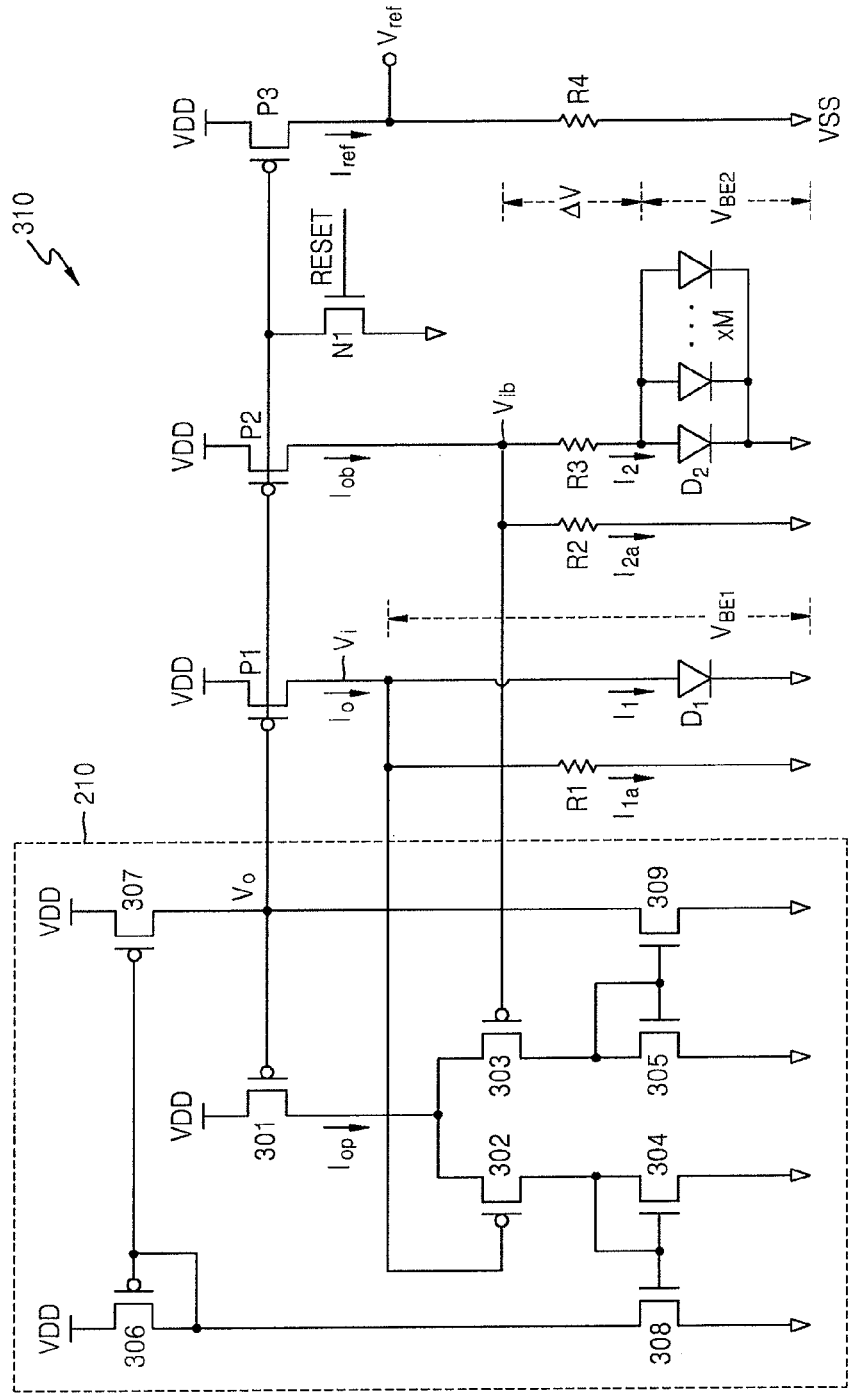
FIG. 4 is a diagram illustrating a bandgap reference voltage generation circuit illustrated in FIG. 3.

As known to one of ordinary skill in the art, the BGR circuit 310 is used in a semiconductor integrated circuit in order to provide a stable bias, and is stable in the face of temperature or process variations. As illustrated in FIG. 4, the BGR circuit 310 includes an OP amp 210 that is formed of a differential amplifier wherein its bias voltage is connected to an output voltage Vo of the OP amp 210. The OP amp 210 includes PMOS transistors 302 and 303, wherein their gates respectively receive a first voltage Vi and a second voltage Vib, a PMOS transistor 301, which is connected between the power supply voltage VDD and sources of the PMOS transistors 302 and 303, and transistors 304 and 308, 305 and 309, and 306 and 307, which pairs form current mirrors. A first current mirror formed of the transistors 304 and 308 is connected to a drain of the PMOS transistor 302, a second current mirror formed of the transistors 305 and 309 is connected to a drain of the PMOS transistor 303, and a third current mirror formed of the transistors 306 and 307 is connected to the transistors 308 and 309. The OP amp 210 is operated by an operation current Iop, which flows through the PMOS transistor 301 that is gated by the output voltage Vo of the OP amp 210. The operation current Iop of the OP amp 210 flows through the PMOS transistor 301 as the output voltage Vo of the OP amp 210 turns to a logic low level by a first NMOS transistor N1 that is turned on in response to a reset signal RESET.

The BGR circuit 310 further includes first through third PMOS transistors P1, P2, and P3, which have the same dimensions, first and second resistors R1 and R2, which have the same resistance value, a first diode D1, a plurality of second diodes D2, wherein the number M is M>0, wherein M is an integer, a third resistor R3, and a fourth resistor R4. The first PMOS transistor P1 is connected between the power-supply voltage VDD and the first voltage Vi, and a gate of the first PMOS transistor P1 is connected to the output voltage Vo of the OP amp 210. The second PMOS transistor P2 is connected between the power-supply voltage VDD and the second voltage Vib, and a gate of the second PMOS transistor P2 is connected to the output voltage Vo of the OP amp 210. The third PMOS transistor P3 is connected between the power-supply voltage VDD and a bandgap reference voltage Vref, and a gate of the third PMOS transistor P3 is connected to the output voltage Vo of the OP amp 210. The fourth resistor R4 is connected between the bandgap reference voltage Vref and a ground voltage VSS. The first resistor R1 is connected between the first voltage Vi and the ground voltage VSS, and the first diode D1 is connected between the first voltage Vi and the ground voltage VSS. The second resistor R2 is connected between the second voltage Vib and the ground voltage VSS. Also, between the second voltage Vib and the ground voltage VSS, the second diodes D2, which are connected in parallel, are connected to the third resistor R3 in series.

The BGR circuit 310 operates as follows. Because the dimensions of the first through third PMOS transistors P1, P2, and P3 are the same and the resistance values of the first and second resistors R1 and R2 are the same, the first voltage Vi at the both ends of the first resistor R1 and the second voltage Vib at the both ends of the second resistor R2 are the same.

$$Vi = Vib \qquad \text{Equation 1}$$

Accordingly, the gates of the first through third PMOS transistors P1, P2, and P3 are commonly connected to the output voltage Vo of the OP amp 210, and thus first through third currents Io, Iob, and Iref are the same.

$$Io = Iob = Iref \qquad \text{Equation 2}$$

In this exemplary embodiment, since I1a=I2a with regards to Io=I1a+I1 and Iob=I2a+I2, Equation 3 can be realized.

$$I1 = I2 \qquad \text{Equation 3}$$

$$\Delta V = V_{BE1} - V_{BE2} = V_T \ln(M) \qquad \text{Equation 4}$$

Here, $V_T$ denotes a thermal voltage and has a temperature coefficient of 0.086 mV/° C.

Because I2 is proportional to $V_T$, Equation 5 can be realized.

$$I2 = \frac{\Delta V}{R3} \qquad \text{Equation 5}$$

Because I2a is proportional to $V_{BE1}$, Equation 6 can be realized.

$$I2a = \frac{V_{BE1}}{R2} \qquad \text{Equation 6}$$

Here, because Iob is an addition of I2 and I2a, and Iob is mirrored to Iref, Equation 7 can be realized.

$$Iref = Iob = I2 + I2a \qquad \text{Equation 7}$$

Accordingly, the bandgap reference voltage Vref, which is an output of the BGR circuit 310 can be obtained as Equation 8.

$$Vref = R4\left(\frac{\Delta V}{R3} + \frac{V_{BE1}}{R2}\right) \qquad \text{Equation 8}$$

In other words, the bandgap reference voltage Vref is determined according to a ratio of the second, third, and fourth resistors R2, R3, and R4, and is barely affected by the resistance value. That is, the BGR circuit 310 is not affected by a variation of the power-supply voltage VDD, and generates the stable bandgap reference voltage Vref according to the ratio of the second third, and fourth resistors R2, R3, and R4. For example, the bandgap reference voltage Vref is set to be approximately 1.2 V.

Referring back to FIG. 3, the reference voltage generator 320 includes an OP amp 321, a PMOS transistor 322, and the first and second resistors R1 and R2. The OP amp 321 is organized in the same manner as the OP amp 210 of FIG. 4, in which the gate of the transistor 303 is a non-inverting input terminal (+) of the OP amp 321 and the gate of the transistor 302 is an inverting input terminal (−) of the OP amp 321. An output terminal Vo of the OP amp 321 is connected to the gate of the pMOS transistor 322. The PMOS transistor 322 and the first and second resistors R1 and R2 are connected in series between the power-supply voltage VDD and the ground voltage VSS. A voltage of a first node NA between the PMOS transistor 322 and the first resistor R1 is a first reference voltage, and a voltage of a second node NB between the first resistor R1 and the second resistor R2 is a second reference voltage. The voltage of the first node NA is an output voltage of the BGR circuit 310, that is, 1.2 V. The voltage of the second node NB, for example, 0.964V, is set by a resistance ratio (R1:R2=0.245:1) of the first and second resistors R1 and R2 from the first node NA.

$$V_{NB} = \frac{R2}{R1 + R2} * V_{NA} = \frac{1}{0.245 + 1} * 1.2 = 0.964 [V] \qquad \text{Equation 9}$$

In the reference voltage generator 320, when the voltage of the first node NA decreases lower than 1.2 V due to a change of the power supply voltage VDD the output of the OP amp 321 is outputted in a low voltage level, and thus the amount of current that flows in the PMOS transistor 322 is increased. Accordingly, the voltage of the first node NA is increased. When the increased voltage of the first node NA is higher than 1.2 V, the output of the OP amp 321 is outputted in a high voltage level, and thus the amount of current that flows in the PMOS transistor 322 is decreased. Accordingly, the voltage of the first node NA is decreased, Consequently, the reference voltage generator 320 stably generates the voltage of the first node NA to be 1.2 V. Also, the voltage of the second node NB that is generated from the voltage of the first node NA is stably generated to be 0.964 V.

The voltage detector 330 includes the third and fourth resistors R3 and R4, which are connected in series between the power supply voltage VDD and the ground voltage VSS. A voltage of a third node NC between the third and fourth resistors R3 and R4 is generated as a detection voltage by distributing the power-supply voltage VDD by a resistance ratio (R3:R4=3.458:1) of the third and fourth resistors R3 and R4. For example, when the power-supply voltage VDD is 4.30 V, the voltage of the third node NC is 0.964 V, and when the power-supply voltage VDD is 5.35 V, the voltage of the third node NC is 1.20 V.

$$V_{NC} = \frac{R4}{R3+R4} * VDD_{min}$$ Equation 10
$$= \frac{1}{3.458+1} * 4.3$$
$$= 0.964[V]$$

$$V_{NC} = \frac{R4}{R3-R4} * VDD_{max}$$
$$= \frac{1}{3.458+1} * 5.35$$
$$= 1.20[V]$$

The comparator 340 includes first and second comparators 341 and 342, which compare the first and second reference voltages and the detection voltage, and a logic circuit 343, which generates a switching control signal SWC. The first comparator 341 compares the voltage of the first node NA, which is the first reference voltage inputted to a non-inverting input terminal (+), and the voltage of the third node NC, which is the detection voltage inputted to an inverting input terminal (−). The second comparator 342 compares the voltage of the second voltage NB, which is the second reference voltage inputted to an inverting input terminal (−), and the voltage of the third node NC, which is inputted to a non-inverting input terminal (+). The logic circuit 343 is formed of an AND gate, which generates the switching control signal SWC by receiving an output ND of the first comparator 341 and an output NE of the second comparator 342.

Figure 5:
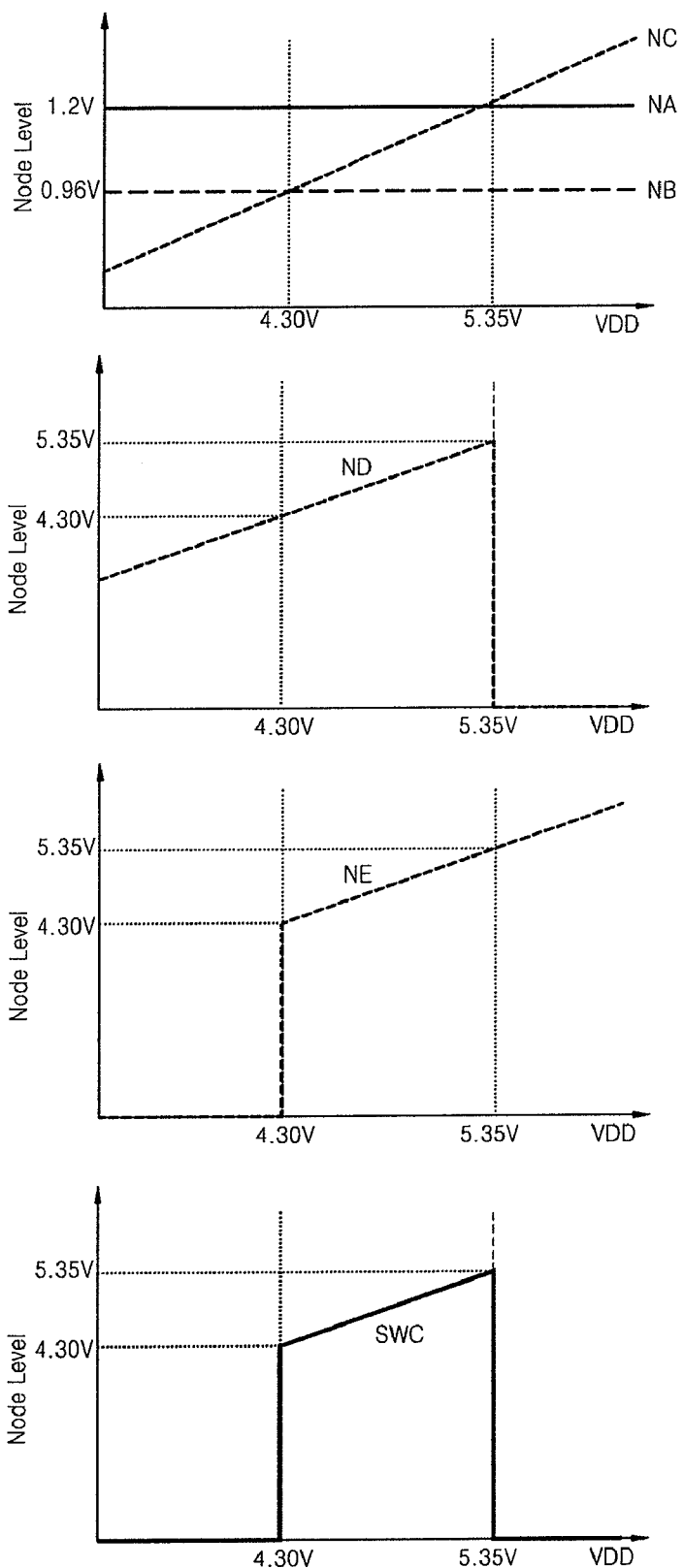
FIG. 5 are graphs for describing operations of a comparator illustrated in FIG. 3.

Operations of the comparator 340 will now be described with reference to FIG. 5. When the power-supply voltage VDD is lower than 4.30 V, the voltage of the third node NC is lower than 0.964 V. The output ND of the first comparator 341 is outputted in a logic high level by comparing the voltage of the third node NC, which is lower than the voltage of the first node NA, that is, 1.20 V, and the output NE of the second comparator 342 is outputted in a logic low level by comparing the voltage of the third node NC, which is lower than the voltage of the second node NB, that is, 0.964 V. Accordingly, the logic circuit 343 generates the switching control signal SWC in a logic low level.

When the power-supply voltage VDD is between 4.30 V and 5.35 V, the voltage of the third node NC is higher than 0.964 V and lower than 1.20 V. The output ND of the first comparator 341 is outputted in a logic high level by comparing the voltage of the first node NA, that is, 1.20 V and the voltage of the third node NC between 0.964 V and 1.20 V, and the voltage NE of the second comparator 342 is outputted in a logic high level by comparing the voltage of the second node NB, that is, 0.964 V and the voltage of the third node NC between 0.964 V and 1.20 V. Accordingly, the logic circuit 343 generates the switching control signal SWC in a logic high level.

When the power-supply voltage VDD is higher than 5.35 V, the voltage of the third node NC is higher than 1.20 V. The output ND of the first comparator 341 is outputted in a logic low level by comparing the voltage of the first node NA, that is, 1.20 V, and the voltage of the third node NC higher than 1.20 V, and the output NE of the second comparator 342 is outputted in a logic low level by comparing the voltage of the second node NB, that is, 0.964 V, and the voltage of the third node NC higher than 1.20 V. Accordingly, the logic circuit 343 generates the switching control signal SWC in a logic low level.

When the power-supply voltage VDD is within an operating voltage range between 4.30 V and 5.35 V, the switch 200 is turned on in response to the switching control signal SWC in a logic high level, and thus the power-supply voltage VDD and the main system 100 are connected. When the power-supply voltage VDD is outside the operating voltage range between 4.30 V and 5.35 V, the switch 200 is turned off in response to the switching control signal SWC in a logic low level, and thus the power-supply voltage VDD and the main system 100 are disconnected.

In the current embodiment, the operating voltage range of the power-supply voltage VDD is between 4.30 V and 5.35 V. When a minimum voltage of the operating voltage is Vmin, and a maximum voltage of the operating voltage is Vmax, the resistance ratios of the first and second resistors R1 and R2, and the third and fourth resistors R3 and R4 described above can be determined as Equation 11 below.

$$\frac{R3}{R4} = \frac{V\max}{Vbg} - 1$$ Equation 11
$$\frac{R2}{R1+R2} * Vbg = \frac{R3}{R3+R4} * V\min$$

Accordingly, the irregular voltage detection and cutoff circuit of the exemplary embodiment of the present invention can accurately control the operating voltage range of the power-supply voltage VDD by cutting off the power-supply voltage VDD outside the operating voltage range by using the BGR circuit that is stable in the face of changes of the power-supply voltage and temperature.

While the present invention has been particularly shown and described with reference to exemplary embodiments thereof, it will be understood by those of ordinary skill in the art that various changes in form and details may be made therein without departing from the spirit and scope of the present invention, as defined by the following claims.

What is claimed is:

1. An irregular voltage detection and cutoff circuit, which monitors an operating voltage range of a power-supply voltage, the irregular voltage detection and cutoff circuit comprising:
   a bandgap reference voltage generation circuit, which generates a bandgap reference voltage from the power-supply voltage;
   a reference voltage generator, which generates a first reference voltage at a same voltage level as the bandgap reference voltage, and a second reference voltage;
   a voltage detector, which generates a detection voltage from the power supply voltage; and
   a comparator, which generates a switching control signal that cuts off the power-supply voltage by comparing the first and second reference voltages with the detection voltage, wherein the reference voltage generator comprises:

an OP amp, wherein bandgap reference voltage is inputted to a non-inverting input terminal thereof and the first reference voltage is inputted to an inverting input terminal thereof;

a PMOS transistor, whose gate is connected to an output of the OP amp, whose source is connected to the power-supply voltage, and whose drain is connected to the first reference voltage:

a first resistor, which is connected between the first reference voltage and the second reference voltage; and a second resistor, which is connected between the second reference voltage and a ground voltage.

2. The irregular voltage detection and cutoff circuit of claim 1, wherein the voltage detector comprises:

a third resistor, which is connected between the power-supply voltage and the detection voltage; and a fourth resistor, which is connected between the detection voltage and the ground voltage.

3. The irregular voltage detection and cutoff circuit of claim 2, wherein the third and fourth resistors have a resistance ratio of $$\frac{R3}{R4} = \frac{V\max}{Vbg} - 1$$

with reference to the bandgap reference voltage and a maximum voltage of the operating voltage range, where R3 denotes the third resistor, R4 denotes the fourth resistor, Vbg denotes the bandgap reference voltage, and Vmax denotes the maximum voltage.

4. The irregular voltage detection and cutoff circuit of claim 2, wherein the first through fourth resistors have a resistance ratio of $$\frac{R2}{R1+R2} * Vbg = \frac{R3}{R3+R4} * V\min$$

with reference to the bandgap reference voltage and a minimum voltage of an operating voltage range, where RF denotes the first resistor, R2 denotes the second resistor, R3 denotes the third resistor, R4 denotes the fourth resistor, Vbg denotes the bandgap reference voltage, and Vmin denotes the minimum voltage.

5. The irregular voltage detection and cutoff circuit of claim 1, wherein the comparator comprises:

a first comparator, which compares the first reference voltage and the detection voltage;

a second comparator, which compares the second reference voltage and the detection voltage; and a logic circuit, which generates the switching control signal by AND operating an output of the first comparator and an output of the second comparator.

6. The irregular voltage detection and cutoff circuit of claim 1, wherein the bandgap reference voltage generation circuit comprises:

an OP amp, which provides an output of the OP amp as a bias voltage and compares a first voltage and a second voltage;

a first NMOS transistor, which is connected between the output of the OP amp and a ground voltage and whose gate is connected to a reset signal;

a first PMOS transistor, which is connected between the power-supply voltage and the first voltage and whose gate is connected to the output of the OP amp;

a second PMOS transistor, which is connected between the power-supply voltage and the second voltage and whose gate is connected to the output of the OP amp;

a third PMOS transistor, which is connected between the power-supply voltage and the bandgap reference voltage and whose gate is connected to the output of the OP amp;

a first resistor, which is connected between the first voltage and the ground voltage;

a first diode, which is connected between the first voltage and the ground voltage;

a second resistor, which is connected between the second voltage and the ground voltage;

a third resistor and a second diode group, which are connected in series between the second voltage and the ground voltage; and a fourth resistor, which is connected between the bandgap reference voltage and the ground voltage.

7. The irregular voltage detection and cutoff circuit of claim 6, wherein the OP amp comprises:

a fourth PMOS transistor, whose source is connected to the power-supply voltage and whose gate is connected to the output of the OP amp;

fifth and sixth PMOS transistors, whose sources are connected to a drain of the fourth PMOS transistor and whose gates are respectively connected to the first voltage and second voltage;

second and third NMOS transistors, which are respectively connected between drains of the fifth and sixth PMOS transistors and the ground voltage and whose drains and gates are connected to each other;

a fourth NMOS transistor, whose gate is connected to the gate of the second NMOS transistor and whose source is connected to the ground voltage so as to form a current mirror with the second NMOS transistor;

a fifth NMOS transistor, whose drain is connected to the output of the OP amp, whose gate is connected to the gate of the third NMOS transistor, and whose source is connected to the ground voltage so as to form a current mirror with the third NMOS transistor;

a seventh PMOS transistor, whose source is connected to the power-supply voltage, and whose drain and gate are connected to a drain of the fourth NMOS transistor; and an eighth PMOS transistor, whose source is connected to the power-supply voltage, whose drain is connected to the output of the OP amp, and whose gate is connected to a gate of the seventh PMOS transistor so as to form a current mirror with the seventh PMOS transistor.

8. The irregular voltage detection and cutoff circuit of claim 6, wherein the second diode group is formed of a plurality of diodes connected in parallel between the third resistor and the ground voltage.

9. The irregular voltage detection and cutoff circuit of claim 1, wherein the switching control signal turns on or off a switch connecting the power-supply voltage and a main system.

* * * * *